Patented Dec. 14, 1937

2,101,843

UNITED STATES PATENT OFFICE 2,101,843

DRY MAKE-UP COSMETIC IN SOLID CAKE FORM

Frank Factor and Paul E. Fisher, Los Angeles, Calif., assignors to Max Factor & Co., Los Angeles, Calif., a corporation of Delaware No Drawing. Application November 27, 1936, Serial No. 112,996

7 Claims. (Cl. 167—91)

The invention relates to a novel cosmetic preparation and methods of compounding the same whereby desired masking power, water resistance, ease of application, translucence and other characteristics are developed in a controllable manner.

The invention also relates to cosmetic preparations in solid form capable of being applied to the skin by the use of water as a vehicle, said preparations after being applied to the skin becoming water-resistant and repellent so that they are not discolored by perspiration or contact with water.

The invention is particularly directed toward those cosmetic preparations termed "make-up bases" which are applied to the skin for the purpose of forming a foundation to which face powder and/or rouge can be applied. The products of this invention are eminently suited for theatrical use or for use by motion picture actors and the like, although they may be employed by the general public for street wear, etc.

Heretofore, make-up has been produced in the form of a paste generally termed "grease paint". This grease paint is an oily mixture containing pigments and requires some skill in its application to the skin. It is objectionable in that it is difficult to apply, the oil often exerts a deleterious effect upon the skin, and necessitates the use of cleansing creams or the like in order to remove it from the skin. Horeover, it exerts an appreciable masking effect so that the natural texture and coloring of the skin is completely masked. Distinctive marking, such as freckles, the distinctive coloring of a dark but shaven beard, etc., are completely covered by these prior preparations, the wearer creating a rather unnatural appearance, particularly upon photography. So-called "body make-up", on the other hand, is simply a suspension of pigments in water or aqueous solution and when applied to the skin does not adhere thereto, is readily discolored by perspiration, and can not be used as a foundation over which powder or rouge can be applied.

The present invention is based upon the discovery that pigments and fillers such as talcum, titanium dioxide, ochre, the various lakes, etc. can be rendered water-repellent and blended with water-soluble or water-dispersible dispersing agents so that the resulting make-up when in dry, compressed cake form may be readily formed into a suspension with water and applied to the skin, whereupon upon drying the water-repellent characteristics of the pigments and fillers are retained in a desired manner. Moreover, it has been discovered that by properly balancing the proportion of oils, waxes and other water-insoluble ingredients and the proportion of water-soluble dispersing agents, the masking qualities, translucence and other characteristics which affect the character of the resulting film on the skin and its ease of application, distribution and removal can be controlled.

An object of the invention, therefore, is to disclose and provide a substantially dry make-up in cake form capable of being applied to the skin by means of water.

Another object of the invention is to disclose and provide a make-up in substantially dry cake form which may be readily applied to the skin with a sponge or other water-absorbent pad to produce a water-repellent foundation or cosmetic film on the skin.

An object of the invention is to disclose and provide a method of treating pigments and fillers for use in cosmetic preparations whereby they are rendered water-repellent and incapable of becoming discolored under the influence of perspiration.

It is also an object of the invention to disclose and provide a method of compounding cosmetic ingredients whereby they are rendered water-repellent and at the same time dispersible in water upon rubbing or trituration.

These and other objects, uses, advantages and characteristics of the invention will become apparent to those skilled in the art from the following detailed description of preferred compositions and methods of procedure.

As stated hereinabove, one of the objects of this invention is to disclose and provide a method of treating cosmetic ingredients such as earth colors, fillers and pigments, whereby the pigments are rendered water-repellent. One of the most commonly employed ingredients is French talc or talcum. This substance, when added to water, immediately becomes wetted, thereby only a very minor proportion of the material floating on the surface of the water. The method of this invention, however, renders even this very finely powdered material water-repellent. The various earth colors, lakes, etc., are also readily wetted with water and in accordance with this invention are made water-repellent when in dry form either in the cake or original container, or on the skin.

It is impractical, however, to simply coat the individual particles of pigments, fillers and colors with an oily or waxy, water-insoluble ingredient. It is to be remembered that the finished product is preferably sold in cake form and means must be provided whereby the make-up preparation can be readily applied to the skin. The present invention, therefore, is drawn to a method whereby the individual particles of pigment, filler and color are rendered water-repellent and at the same time combined with an agent capable of dispersing the preparation in water so that the preparation may be readily applied and readily and easily removed from the skin when such removal is desired.

It has been found that suitable cosmetic preparations may be made, such preparations containing from about 2.5% to about 9% by weight of oily and waxy constituents which are not water-soluble. Some preparations may contain only about 1% of the waxy and oily ingredients but such preparations are not as effective while others may contain up to about 26% of oily and waxy constituents but these are of value only when the effect of a shiny skin is desired. These small quantities of oils and waxes (2.5%–9%) are sufficient to render the pigments and fillers sufficiently water-resisting, even though the content of talcum preferably varies from about 35% to 80% by weight of the total preparation and the pigments (including lakes, earth colors, titanium dioxide, zinc oxide, etc.) constitute from about 12% to 50% of the total preparation. The total content of pigments, fillers, colors, talcum and similar solids will usually range from about 75% to 90% by weight, although in some instances as little as 70% or as much as 97% may be present. In order to permit such preparations to be readily applied to the skin and at the same time removable from the skin without the necessity of using cleansing creams, etc., the completed preparation should preferably contain from about 1% by weight to about 13% by weight of a suitable water-miscible or water-soluble dispersing agent. In some cases the presence of dispersing agents in optimum quantity is not necessary, particularly when the users of the cosmetic preparation prefer to remove the cosmetic with a cleansing cream.

These water-soluble or water-miscible dispersing agents may comprise a number of different substances. Illustrative of this group are triethanolamine soaps and other water-soluble soaps, preferably of low alkalinity and suitable for cosmetic purposes. Lanolin, sulfonated alcohols and other surface tension reducing agents such as the alkylated sulfonic acids and certain substances which are both water-miscible and oil-soluble such as the glycol derivatives including diethylene glycol, glycerine, etc., may be used.

It is to be understood that these various substances differ greatly in their wetting power and ability to reduce surface tension so that obviously equal quantities of all of these substances can not be used interchangeably. Some of the sulfonated alcohols, for example, are extremely powerful wetting agents whereas diethylene glycol is not. A smaller percentage of the sulfonated alcohols than the percentage of diethylene glycol, for example, will give substantially the same effect.

Plasticizing agents such as cetyl alcohol, may also be employed. In all instances, the quantity of water-soluble dispersing agents determines the ease with which the finished product may be applied to the skin in the form of a water suspension and the ease with which the make-up may be removed from the skin after use. Furthermore, the masking power of the preparation may be increased by reducing the proportion of water-soluble dispersing agents and increasing the proportion of oils and waxes, it being understood that for all general purposes the percentage of oils and waxes and that of dispersing agents present in the preparation falls within the limits outlined hereinabove.

In order to facilitate understanding, the preparation of a specific make-up cake will be described in detail. The following example particularly relates to a make-up suitable for theatrical purposes. This make-up has a fair masking power and when applied to the skin will form a film which covers the larger pores and spots such as freckles, etc. The masking power of this preparation is greater than that which would be used as a make-up for street or society use. This make-up may be prepared as follows:

Oils and waxes may be blended with the plasticizing agents and water-soluble dispersing agents so as to form what may be termed a synthetic wax base for use in subsequent manufacturing operations. Such a synthetic wax base may contain, for example—

| | Percent |
|---|---|
| Olive oil or petroleum oil | 80 |
| Paraffin wax or beeswax | 2.24 |
| Stearic acid or oleic acid | 13.5 |
| Triethanolamine | 1.34 |
| Potassium or sodium hydroxide | 0.66 |
| Lauryl or cetyl alcohol | 2.24 |

If desired, all of the above ingredients with the exception of the mineral oil (which when used is ordinarily a heavy, highly refined liquid petrolatum) may be intimately mixed and melted together. Such melted mass is then intimately incorporated with the mineral oil to form a pasty, substantially white, oily mixture.

In preparing the composition in accordance with the following process, it has been found desirable to use diethylene glycol in addition, for the purpose of facilitating the distribution of the oily and waxy constituents and water-dispersible agents homogeneously throughout the finely divided and solid materials, pigments, lakes, earth colors and fillers. As a result, the procedure is now as follows:

The desired quantity of the mixture of oils, waxes and dispersing agents is intimately mixed with diethylene glycol. Water is then added to this mixture slowly with accompanying agitation so as to form an oil-in-water emulsion or dispersion. In order to facilitate the formation of a cake which will not crumble or shrink excessively upon storage over a long period of time, a water solution of a gummy material is then added to the emulsion or dispersion. Any hydrophyllic colloid may be used, for example, various vegetable gums such as gum tragacanth, gum karaya, gum acacia, agar, pectin, quince seed extract, etc., but the aqueous extract of quince seeds is particularly desirable in that it appears to retain a small amount of water very tenaciously over very long periods of time.

To this fairly liquid mass the desired pigments and fillers are added and all of these ingredients are then thoroughly mixed either by trituration in a mortar or by repeated passage through a roller mill. During this mixing operation the emulsion or dispersion appears to break, the very finely divided solid constituents becoming oil-wetted and/or coated with the oily and waxy ingredients, the aqueous phase tending to separate out upon the application of pressure. During this mixing operation, from about 0.75 to 1.2 parts of fillers, pigments and colors are preferably mixed with 1 part by weight of the emulsion, depending somewhat upon the fineness of subdivision of the solids. Preferably, the resulting mixture should not evidence the separation of any large quantity of free water nor should the mixture become too dry.

The resulting thick paste may then be dried in any suitable manner as, for example, on cylindrical driers, or by being spread out in a relatively thin coating on trays or continuous belts and passed through a drying chamber. Temperatures ranging from 100° C. to 130° C. may be used during drying. After being dried the material is preferably pulverized to break up agglomerates, screened through a 50, 60 or even 80 mesh sieve, and the resulting powder then used in forming the final make-up cakes. Any suitable pressure molding apparatus may be used, the powder being supplied to the molds and pressed to form a coherent cake or body.

The illustrative composition to which reference has been made in the above example will have the following composition on a wet and on a dry basis.

|  | Wet | Dry |
| --- | --- | --- |
|  | Percent | Percent |
| Mineral oil | 3.56 | 6.4 |
| Synthetic wax | 0.89 | 1.6 |
| Diethylene glycol | 3.36 | 6.0 |
| Pigments | 27.44 | 49.0 |
| Talc | 20.72 | 37.0 |
| Water | 44.0 | 0 |
|  | 99.97 | 100.0 |

Attention is called to the fact that the quince seed extract is not mentioned in the above tabulated proportions since the quantity of quince seed solids supplied is but a very small amount, ordinarily ranging from about 0.02% to not more than 1%.

The cake make-up made as described hereinabove may be applied to the skin by simply wetting a sponge or pad of absorbent with water and then rubbing the surface of the cake therewith. It will be found that the oil-coated pigments will adhere to the sponge and may be then transferred and spread over the skin. Excessive quantities of water need not be used and the sponge or pad need only be sufficiently wet to pick up the make-up from the cake. After this make-up is applied to the skin and permitted to dry, it will be found that the now dried make-up is again water-repellent so that perspiration will not change the color thereof and instead will roll over the make-up surface without making streaks thereon.

As a matter of fact, a person covered with the make-up of this invention can take a tempered water shower without causing the make-up to come off. If, however, it is desired to remove the make-up from the skin, then it is only necessary to use toilet soap and water and a little rubbing.

In other words, the ingredients of this composition are so balanced that even though the particles are water-resisting and water-repellent, the water-soluble dispersing agents which are simultaneously present in the composition are capable of causing these oil-coated particles to go into suspension in the presence of water, provided the composition is rubbed, triturated or thoroughly agitated in the presence of water.

Attention is called to the fact that in the above completed composition 6.4% of mineral oil is present. As a result, the composition has considerable masking power. If it is desired to produce a similar cake make-up suitable for street wear, the quantity of oils and waxes is reduced. For example, a finished cake make-up suitable for street wear may contain the following ingredients:

|  | Per cent |
| --- | --- |
| Oils and waxes | 2.8 |
| Plasticizing and dispersing agents | 5.3 |
| Pigments | 13.3 |
| Talcum | 78.6 |

It is to be noted that in the above composition not only is the quantity of oils and waxes materially reduced but in addition the quantity of plasticizing and water-dispersing agents is somewhat increased. In this manner a thinner, more translucent film of make-up may be applied to the skin. The masking effect is reduced by the increase in the proportion of dispersing agents. The resulting made-up is therefore eminently suited for normal street wear, permitting freckles and other minor blemishes to be seen through the make-up, thereby obviating the mask-like characteristics of many theatrical cosmetics.

Further examples illustrative of compositions which can be used are as follows:

| | | |
| --- | --- | --- |
| Oils and waxes | 0.8% | 24.0% |
| Plasticizers and dispersing agents | 2.2% | 6.0% |
| Pigments, colors and fillers | 97.% | 70.% |

The first of these compositions is capable of being used for light shades and will not have water-repellent characteristics developed to an optimum. The second composition given hereinabove is particularly adapted for use in creating the effect of a shiny skin.

Those compositions coming within the optimum ranges described hereinabove are characterized by the fact that when the composition is reduced to a substantially dry powdered condition, the powder will resist wetting with water and will float on the surface of the body of water, although upon trituration or rubbing the composition becomes suspended in the water. Upon drying again, the suspension results in a coating which is again water-repellent.

Although in the preferred examples given herein mineral oil was specifically mentioned because of its stability and uniformity, other oils and fats such as vegetable oils, animal oils (benzoinated lard, for example) and hydrogenated products may be used. Instead of stearic acid, other fatty acids may be employed. Vegetable or animal waxes can also be substituted, wholly or in part, for the paraffin wax of the specific examples. Those skilled in the art will be able to readily make changes in the compositions coming within the purview of this invention by considering the characteristics and physical properties of the available materials and compensating therefor while keeping the teachings of the invention in mind.

The various changes, modifications, adaptations and uses coming within the scope of the appended claims are embraced thereby.

We claim:

1. A make-up cosmetic in solid cake form containing from about 35% to 80% by weight of filler and from about 12% to 50% by weight of pigments, lakes and earth colors, said filler, lakes, pigments and earth colors being substantially water-repellent; said cake containing from about 2.5% to 9% by weight of oils and waxes and also containing from about 1% to 13% by weight of water-soluble dispersing agents whereby said make-up may be applied to the skin by moistening a pad with water, rubbing it over the cake and then applying to the skin.

2. A substantially dry make-up cosmetic in solid cake form containing from about 75% to 90% by weight of fillers, pigments and colors, about 2.5% to 9% by weight of oils and waxes, and from about 1% to 13% by weight of water-soluble dispersing agents, the particles of fillers, colors and pigments being coated with said oils and waxes and being substantially water-repellent, said make-up having the property of becoming suspended in water when a cake thereof is rubbed with a moistened pad.

3. A make-up cosmetic in solid cake form containing from about 75% to 90% by weight of pigments, fillers and colors, 2.5% to 9% of oils and waxes and 1% to 13% by weight of water-soluble dispersing agents from the group consisting of ethanolamine soaps and glycerine, glycol and glycol derivatives.

4. A colored make-up cosmetic in substantially dry, solid cake form containing from about 70% to 97% by weight of colors, pigments and fillers, 1% to 26% by weight of oils and waxes and 1% to 13% by weight of water-soluble dispersing agents.

5. A method of making a cosmetic in substantially dry, solid cake form which comprises: forming an emulsion of oils and waxes with a water soluble dispersing agent in an aqueous medium, incorporating pigments and colors in finely divided form into said emulsion in quantity sufficient to constitute 70% to 97% by weight of the total mixture on a dry basis, drying the resulting mixture, pulverizing the dried product, and compressing the product to form cakes.

6. A method of making a make-up cosmetic in solid cake form comprising forming an emulsion of oils and waxes in an aqueous medium, incorporating from about 0.75 part to 1.2 part of fillers, pigments and colors in finely divided form to 1 part of said emulsion by weight to form a pasty mass containing 75% to 95% of fillers, pigments and colors by weight of the total mass on a dry basis, drying the mass, pulverizing the dried product, and compressing the same to form cakes.

7. A method of making a make-up cosmetic in substantially dry, solid cake form comprising forming an emulsion of oils and waxes in an aqueous medium containing water-soluble dispersing and plasticizing agents, incorporating from about 0.75 parts to 1.2 parts by weight of pigments, fillers and colors to 1 part of said emulsion so as to form a pasty mass containing 75% to 95% of fillers, pigments and colors by weight of the total mass on a dry basis, drying the mass, pulverizing the dried product, and compressing the same to form cakes.

FRANK FACTOR.
PAUL E. FISHER.